L. B. Bradley,
Jaw Trap,
№ 13,483.   Patented Aug. 28, 1855.

UNITED STATES PATENT OFFICE.

S. B. BRADLEY, OF WATERTOWN, CONNECTICUT.

TRAP FOR CATCHING ANIMALS.

Specification of Letters Patent No. 13,483, dated August 28, 1855.

*To all whom it may concern:*

Be it known that I, L. B. BRADLEY, of Watertown, in the county of Litchfield and State of Connecticut, have invented a new and useful Improvement in Game-Traps; and I do hereby declare that the following is a full, clear, and exact description of the same, reference being had to the accompanying drawings, forming part of this specification, in which—

Figure 1:
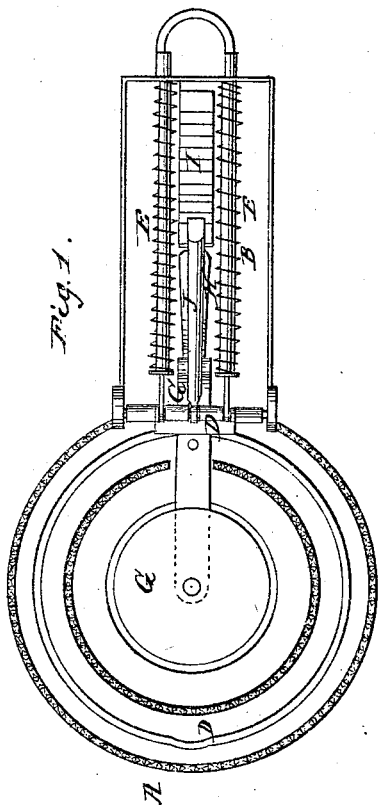
Figure 2:
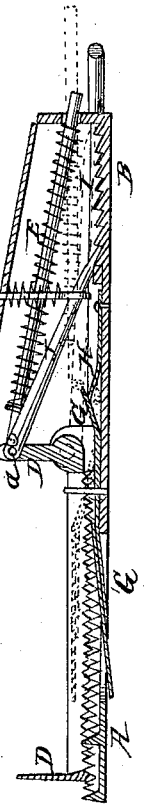

Figure 1, is a plan of a game trap, with my improvement applied to it, as it appears when unset. Fig. 2, is a vertical longitudinal section of the same. In this view the trap is shown in black lines, unset, and in red lines, set.

Similar letters of reference indicate corresponding parts in the two figures.

My improvement is designed to render the trap herein shown, useful for catching game, it rendering it capable of always securely confining the animal after it has once been caught under the drop or fall.

The nature of said improvement consists in the application of a ratchet bar and pawl to the trap in such a manner that as the trap is unset and the animal caught under the drop or fall, the pawl will be caused to bear against one of the teeth of the ratchet bar and owing to this it will be impossible for the drop or fall to be raised by the animal unless the pawl be first moved out of contact with the ratchet bar.

To enable others to fully understand my invention and apply and use the same I will proceed to describe it more minutely.

A, represents the base of an ordinary trap; B, the handle or extension on the rear of the same; D, the drop or fall; E, E, spiral springs for giving force to the fall; two being employed in this instance as the trap is designed for catching large game; G, the tilting bottom for starting on unsetting the trap through the weight of the animal, and H, the counterbalancing spring.

I, is the ratchet bar cast on the upper side of the extension or handle B, and J, the pawl, hanging loosely on the fulcrum pin *a*, of the springs E, E, as shown. The rear end of the pawl J, when the trap is set, is made to pass beyond the teeth of the ratchet as shown in red, but when the trap is unset is drawn forward on account of being attached to the fall and made to bear such a relation to one of the teeth of the ratchet bar as shown in black that in case the animal caught under the fall endeavors to escape by raising the fall, it, the pawl, is caused to bear against said tooth and thus prevent all possibility of the fall being lifted sufficiently high to admit of his escape. By examining the drawing it will be seen that the pawl and ratchet are so arranged that they act only when the animal makes an effort to escape, and therefore whenever this effort is increased the more certain is the detention.

This improvement is very simple and yet very important for in traps constructed without it there is much danger if a strong animal be caught of the fall being raised and the animal escaping.

What I claim as my invention and desire to secure by Letters Patent, is—

The application in the manner herein shown, of the ratchet bar I, and pawl J, to the trap, for the purpose of rendering it capable of confining the animal after being caught under the drop or fall, as set forth.

LUCIUS B. BRADLEY.

Witnesses:
LEMAN W. CUTLER,
JOEL B. WILLIAMS.